(12) United States Patent
Terao

(10) Patent No.: US 6,816,674 B2
(45) Date of Patent: Nov. 9, 2004

(54) BLUR CORRECTING DEVICE AND LENS BARREL

(75) Inventor: Kentaro Terao, Zama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/367,817

(22) Filed: Feb. 19, 2003

(65) Prior Publication Data

US 2004/0057710 A1 Mar. 25, 2004

(30) Foreign Application Priority Data

Feb. 20, 2002 (JP) ........................................ 2002-042643

(51) Int. Cl.[7] .............................................. G03B 5/00
(52) U.S. Cl. ...................................................... 396/55
(58) Field of Search ............. 396/52–55; 359/554–559; 348/208.7–208.11

(56) References Cited

U.S. PATENT DOCUMENTS 5,761,546 A * 6/1998 Imada ........................... 396/55

FOREIGN PATENT DOCUMENTS

| JP | A 6-67274 | 3/1994 | ........... G03B/17/00 |
| JP | A 8-87046 | 4/1996 | ............ G03B/5/00 |
| JP | A 8-211436 | 8/1996 | ............ G03B/5/00 |

* cited by examiner

Primary Examiner—W. B. Perkey
(74) Attorney, Agent, or Firm—Oliff & Berridge, PLC

(57) ABSTRACT

A blur correcting device comprises: a blur correction optical system that corrects an image blur by moving along a direction substantially perpendicular to an optical axis; a locking member that locks the blur correction optical system when an image blur correction is not executed; and a lock drive device having an elongated external shape with a length thereof set along a direction in which a tangential line of a circle having a center thereof at the optical axis extends on a plane substantially perpendicular to the optical axis, which generates a drive force to drive the locking member.

10 Claims, 8 Drawing Sheets

BLUR CORRECTING DEVICE AND LENS BARREL

INCORPORATION BY REFERENCE

The disclosure of the following priority application is herein incorporated by reference: Japanese Patent Application No. 2002-042643 filed Feb. 20, 2002

BACKGROUND OF THE INVENTION

1. Field of the Invention

The present invention relates to a blur correcting device that corrects a blur occurring in a subject image and a lens barrel, used in an optical apparatus such as a camera.

2. Description of Related Art

Devices of this sort in the related art include those that correct an image blur by causing a blur correction optical system to shift within a plane substantially perpendicular to the optical axis of the optical system with an actuator such as a VCM (a voice coil motor).

Among such blur correcting devices in the known art, some are mounted with a locking device that holds the blur correction optical system at a specific position when its blur correcting function is not engaged.

For instance, Japanese Laid-Open Patent Publication No. H 08-211436 and Japanese Laid-Open Patent Publication No. H 08-87046 each disclose a locking mechanism achieved by utilizing a rotating ring-shaped member.

However, there are disadvantages to such a locking mechanism that utilizes a rotating ring-shaped member in that since the moment of inertia of the ring-shaped member is significant, the locking actuator must consume a great deal of power in order to execute a locking operation and a lock-releasing operation within a short period of time and in that the structure of the locking mechanism itself is bound to be complex and large.

In addition, Japanese Laid-Open Patent Publication No. H06-67274 proposes a locking mechanism which drives a pin with a latch solenoid.

FIGS. 7 and 8 present an example of a locking mechanism in the related art that drives a pin with a latch solenoid.

The locking mechanism in the related art comprises a locking pin 30, a locking spring 31, a locking lever 32 and a latch solenoid 33.

The locking pin 30, which is engaged with a casing member 8 at engaging portions 8a and 8b, is allowed to move along directions X1 and X2 running substantially parallel to an optical axis I in FIG. 7. The locking pin 30 includes a locking pin collar portion 30a, and a force is applied to the locking pin 30 by the locking spring 31 provided between the casing member 8 and the locking pin collar portion 30a in the direction X2, i.e., in the lock-releasing direction.

The latch solenoid 33 is fixed to the casing member 8, and a plunger 33a is allowed to move along the directions X1 and X2 when an electric current is supplied to the latch solenoid.

The locking lever 32 is mounted at the casing member 8 so as to be allowed to rotate freely around a rotational center 8g, with its one end 32b engaged with the locking pin collar portion 30a and the other end 32a engaged with the plunger 33a.

During a locking operation, power is supplied to the latch solenoid 33 to pull the plunger 33a in the direction X2, which, in turn, causes the locking pin 30 to project out in the direction X1 via the locking lever 32. As a result, the locking pin 30 is driven into a locking hole 6f formed at a lens frame 6, and a blur correction lens 3 becomes held at a specific position.

During a lock-releasing operation, the force with which the plunger 33a is pulled in the direction X2 is weakened by supplying power to the latch solenoid 33 in a direction opposite from the direction in which power is supplied during the locking operation. Accordingly, the locking spring 31 causes the locking pin 30 to move in the direction X2, thereby releasing the lock on the blur correction lens 3.

However, while the locking mechanism that drives the pin with a latch solenoid enables the locking operation and lock-releasing operation to be executed within a very short period of time without requiring a great deal of power or a complex structure, there is a problem in that such a locking mechanism takes up considerable space and, in particular, requires a significant amount of space along the optical axis. There is an added concern in that the locking mechanism may restrict the movement of the optical system during zooming and focusing operations.

SUMMARY OF THE INVENTION

The present invention is to provide a blur correcting device, a lens barrel and the like, that allow a blur correction optical system to be locked and released very quickly with a high degree of reliability by adopting a simple structure that does not take up a great deal of space or require a great deal of power.

A blur correcting device according to the present invention comprises: a blur correction optical system that corrects an image blur by moving along a direction substantially perpendicular to an optical axis; a locking member that locks the blur correction optical system when an image blur correction is not executed; and a lock drive device having an elongated external shape with a length thereof set along a direction in which a tangential line of a circle having a center thereof at the optical axis extends on a plane substantially perpendicular to the optical axis, which generates a drive force to drive the locking member.

In this blur correcting device, it is preferable that the locking member locks the blur correction optical system by moving along the optical axis; the lock drive device generates the drive force along a direction in which the length thereof extends; and a transmitting member that transmits the drive force generated along the direction of the length of the lock drive device to the locking member by altering the direction to a direction in which the optical axis extends is also provided. In such a structure, it is preferable that the transmitting member is capable of rotating around a supporting point, and a triangle is formed by the supporting point, a point of application for the locking member and a point of application for the lock drive device. It is also preferable that a dimension of the lock drive device along a direction perpendicular to its lengthwise direction is smaller than a dimension of the locking member taken along the optical axis.

A lens barrel according to the present invention comprises a blur correcting device described above.

A photographing apparatus according to the present invention comprises a blur correcting device.

In another aspect of the lens barrel according to the present invention, the lens barrel comprises: a photographic optical system; a blur correction optical system constituting at least part of the photographic optical system, which corrects a blur by moving along a direction substantially perpendicular to an optical axis; a locking mechanism that locks the blur correction optical system when a blur correction operation is not executed; and a locking actuator having an elongated external shape with a length thereof set along a direction in which a tangential line of a circle having a center thereof at the optical axis extends on a plane substantially perpendicular to the optical axis, which generates a drive force to drive the locking mechanism.

It is preferable that this lens barrel further comprises: a blur correction actuator that drives the blur correction optical system; and a base member having an external circumference thereof formed as a substantially cylindrical surface, in which the blur correction actuator, the blur correction optical system, the locking mechanism and the locking actuator are provided, and that the locking actuator is a latch solenoid installed at a position at which the latch solenoid does not eclipse an effective optical path of the blur correction optical system and also the latch solenoid does not project out from the external circumference of the base member. In this case, it is preferable that the locking mechanism includes a locking pin that moves along a direction substantially parallel to the optical axis to become engaged with an engaging hole provided at the blur correction optical system; and a transmitting member that transmits the drive force imparted by the locking actuator to the locking pin; and that the transmitting member transmits the drive force from the locking actuator to the locking pin by altering a direction of the drive force.

DESCRIPTION OF THE PREFERRED EMBODIMENT

The following is a detailed explanation of the embodiment of the present invention, given in reference to the drawings.

Figure 6:
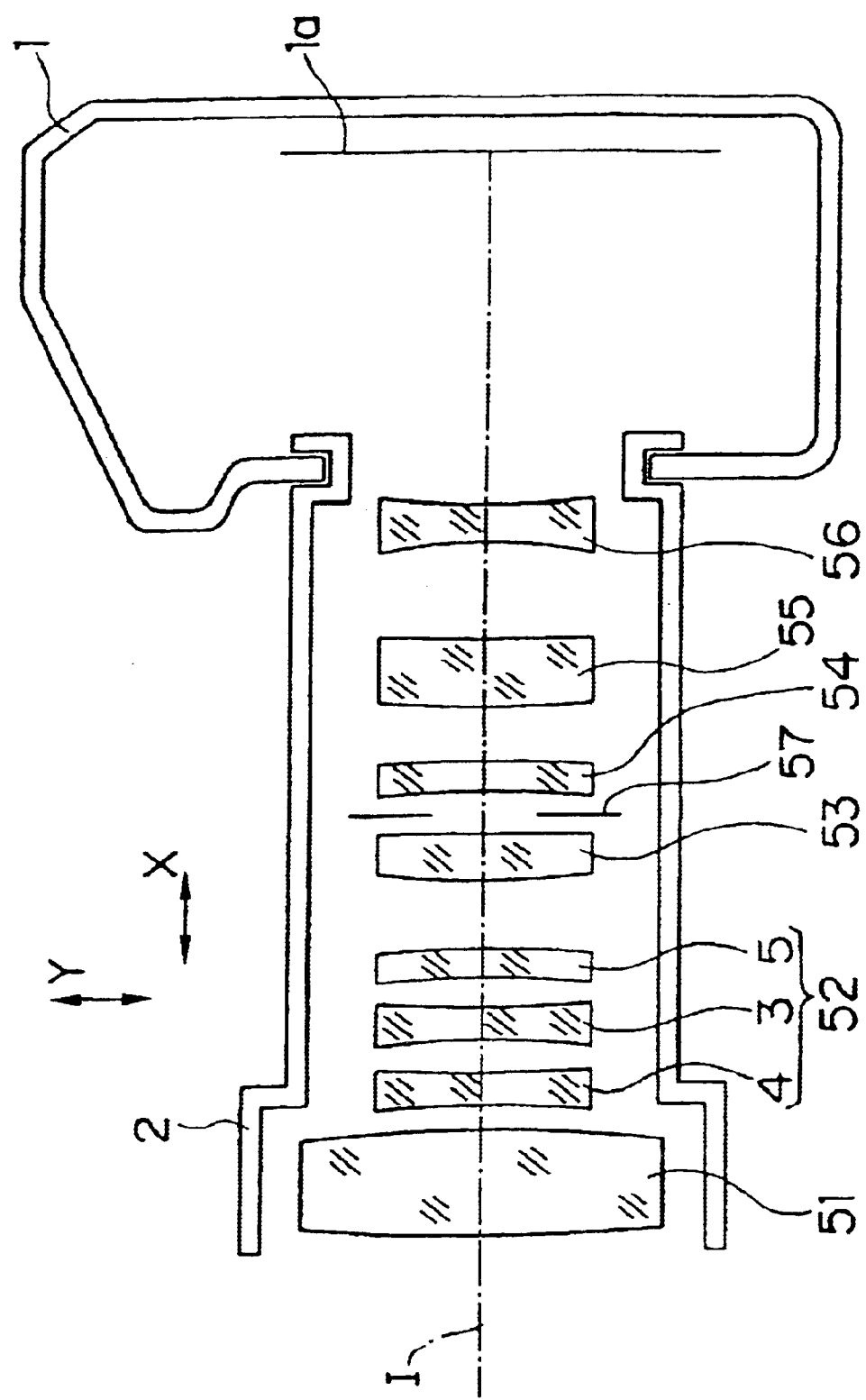
FIG. 6 is a sectional view of a camera system (the camera 1 and the lens barrel 2) internally provided with the blur correcting device achieved in the embodiment of the present invention.
Figure 7:
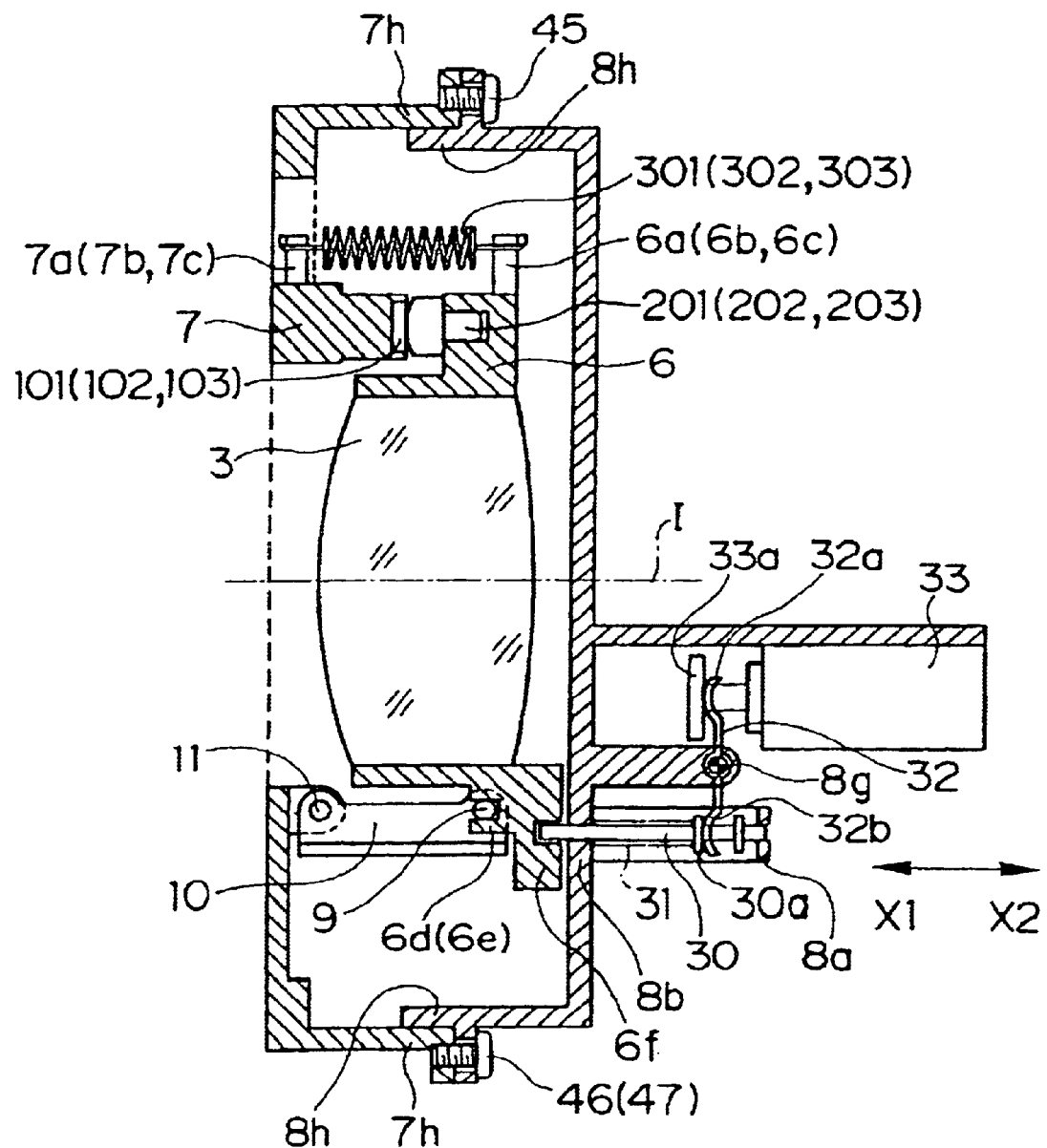
FIG. 7 presents an example of a locking mechanism in the related art that drives a pin with a latch solenoid.
Figure 8:
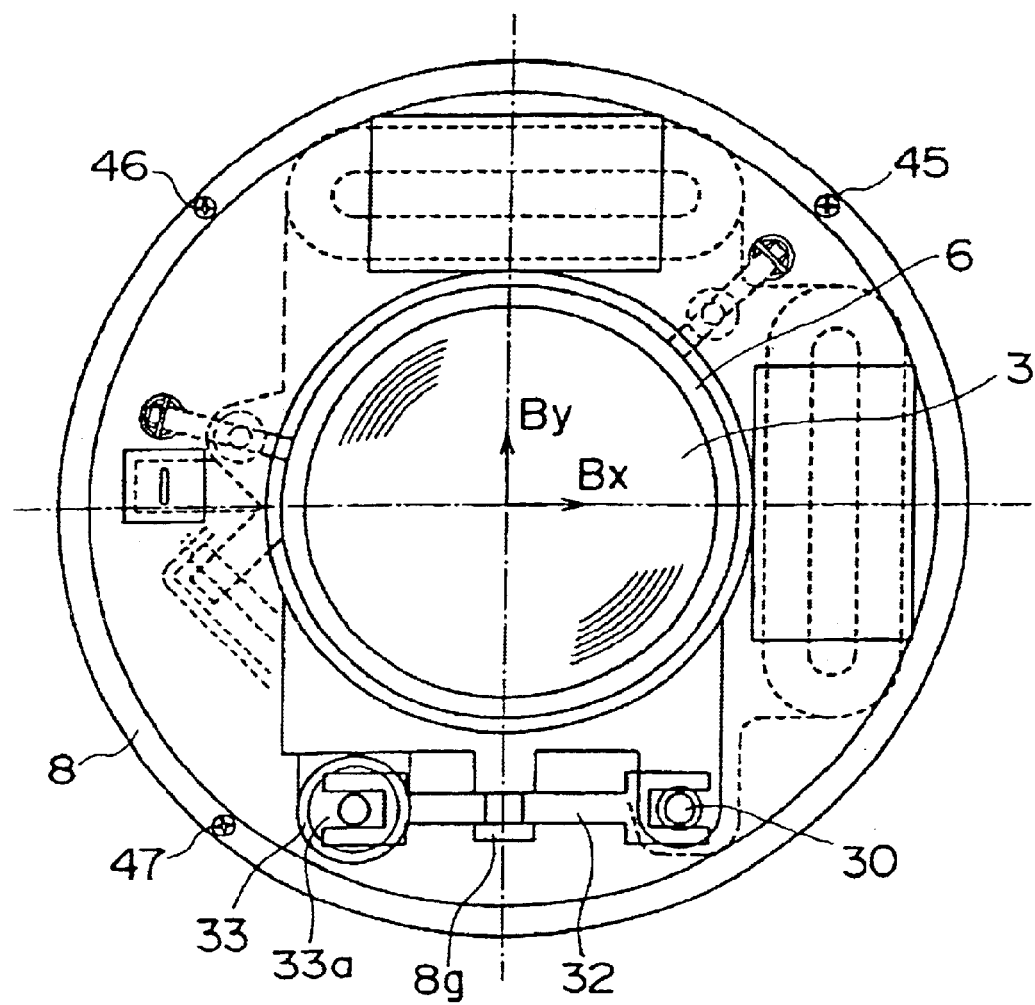
FIG. 8 presents an example of a locking mechanism in the related art that drives a pin with a latch solenoid.

FIG. 6 is a sectional view of a camera system (a camera 1 and a lens barrel 2), internally provided with the blur correcting device achieved in the embodiment of the present invention.

The lens barrel 2 can be detachably mounted at the camera 1. The lens barrel 2 is a zoom lens with 6 lens groups which includes a first lens group 51, a second lens group 52, a third lens group 53, a fourth lens group 54, a fifth lens group 55, a sixth lens group 56 and an aperture 57.

The magnification factor is altered by causing the first lens group 51, the third lens group 53, the fifth lens group 55, the sixth lens group 56 and the aperture 57 to move along a direction matching the direction of the optical axis I (the direction indicated by the arrow X) in the lens barrel 2.

The first lens group 51 is a focal adjustment lens group that forms an image of a subject at an image plane 1a by moving along the direction matching the direction of the optical axis I (the direction indicated by the arrow X).

The second lens group 52 and the fourth lens group 54 do not move along the direction indicated by the arrow X when adjusting the magnification factor or during a focal point adjustment. The second lens group 52 includes a blur correction lens 3 and non-blur correction lenses 4 and 5. The blur correction lens 3 constitutes a blur correction optical system that corrects an image blur as it is driven along a direction perpendicular to the optical axis I (the direction indicated by the arrow Y) and also along a direction perpendicular to the drawing sheet.

FIGS. 1~4 show the blur correcting device in the lens barrel achieved in the embodiment.

Figure 1:
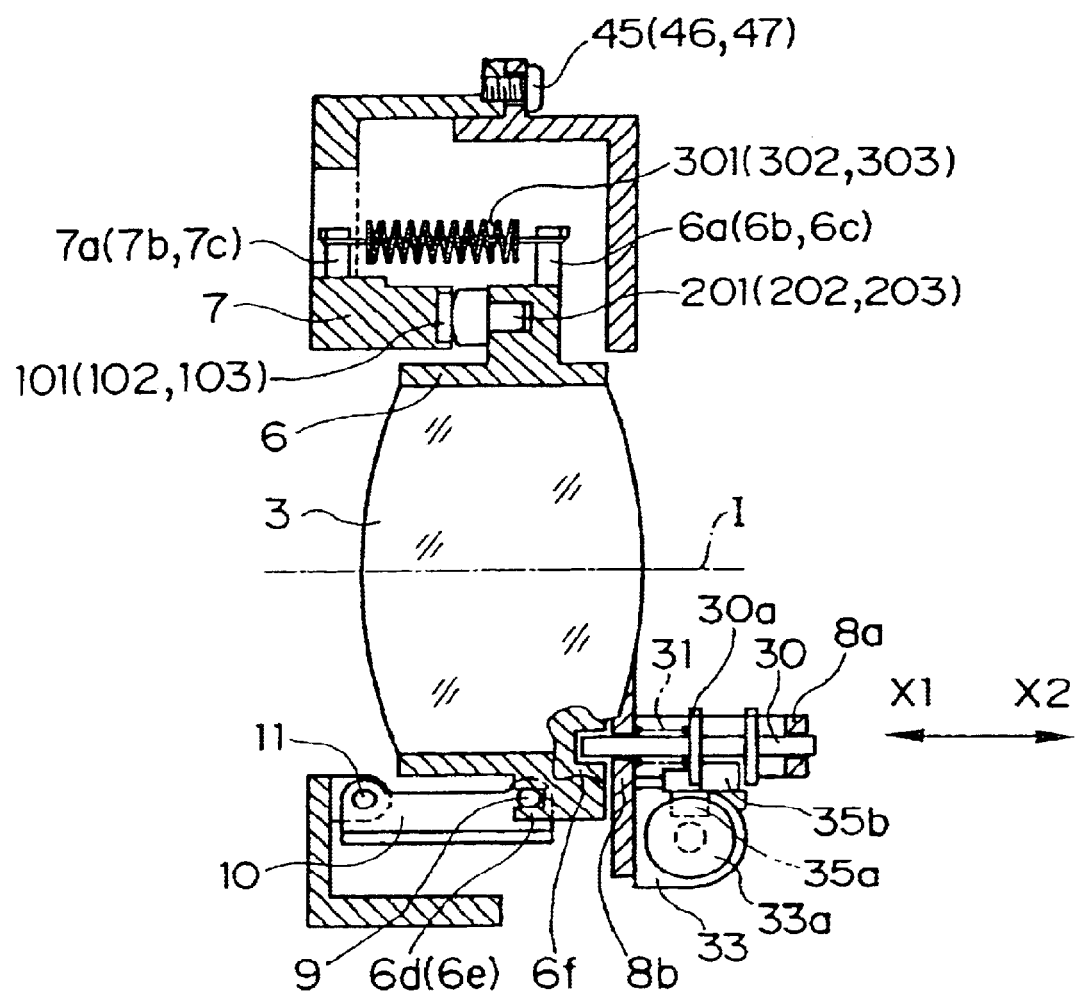
FIG. 1 is a sectional view of the blur correcting device at the lens barrel achieved in an embodiment.
Figure 3:
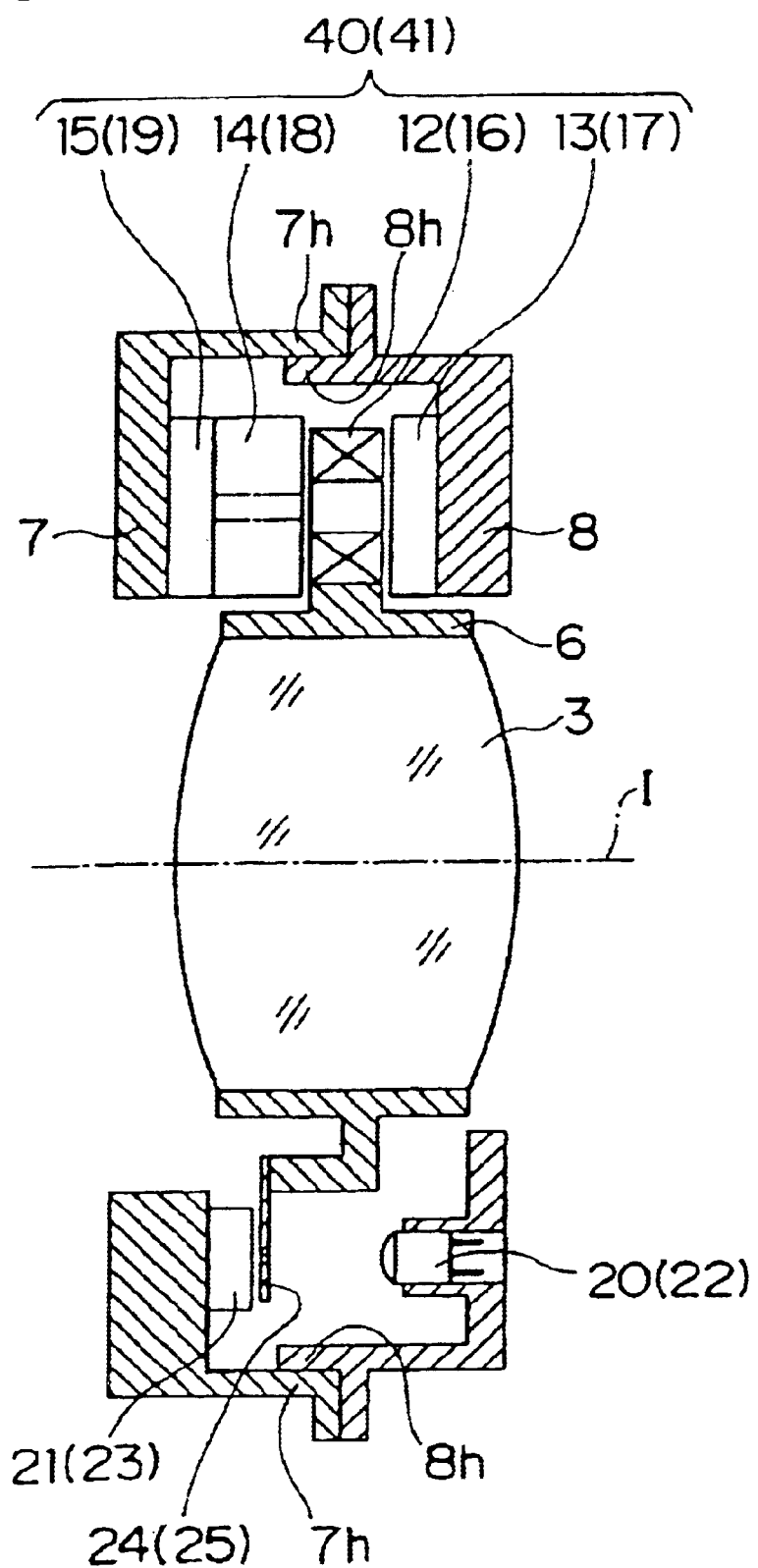
FIG. 3 is a sectional view of the blur correcting device at the lens barrel achieved in the embodiment.

It is to be noted that the sectional views presented in FIGS. 1 and 3 are conceptual diagrams schematically illustrating the blur correcting device to facilitate the explanation, with the reference numerals of components having identical features and functions included in the notation to ensure a better understanding of the embodiment.

The blur correction lens 3 is fixed to a lens frame 6. The lens frame 6 is driven along a direction By and a direction Bx in FIGS. 2 and 4 by voice coil motors (VCMs) 40 and 41. Two coils 12 and 16 are fixed to the lens frame 6.

The voice coil motor 40 is an actuator constituted with a yoke 13, the coil 12, a permanent magnet 14 and a yoke 15, as shown in FIG. 3. The yoke 13 is fixed to the casing member 8. The yoke 15 is fixed to a base member 7, whereas the permanent magnet 14 is fixed onto the yoke 15. The coil 12 is set between the yoke 13 and the permanent magnet 14.

Figure 2:
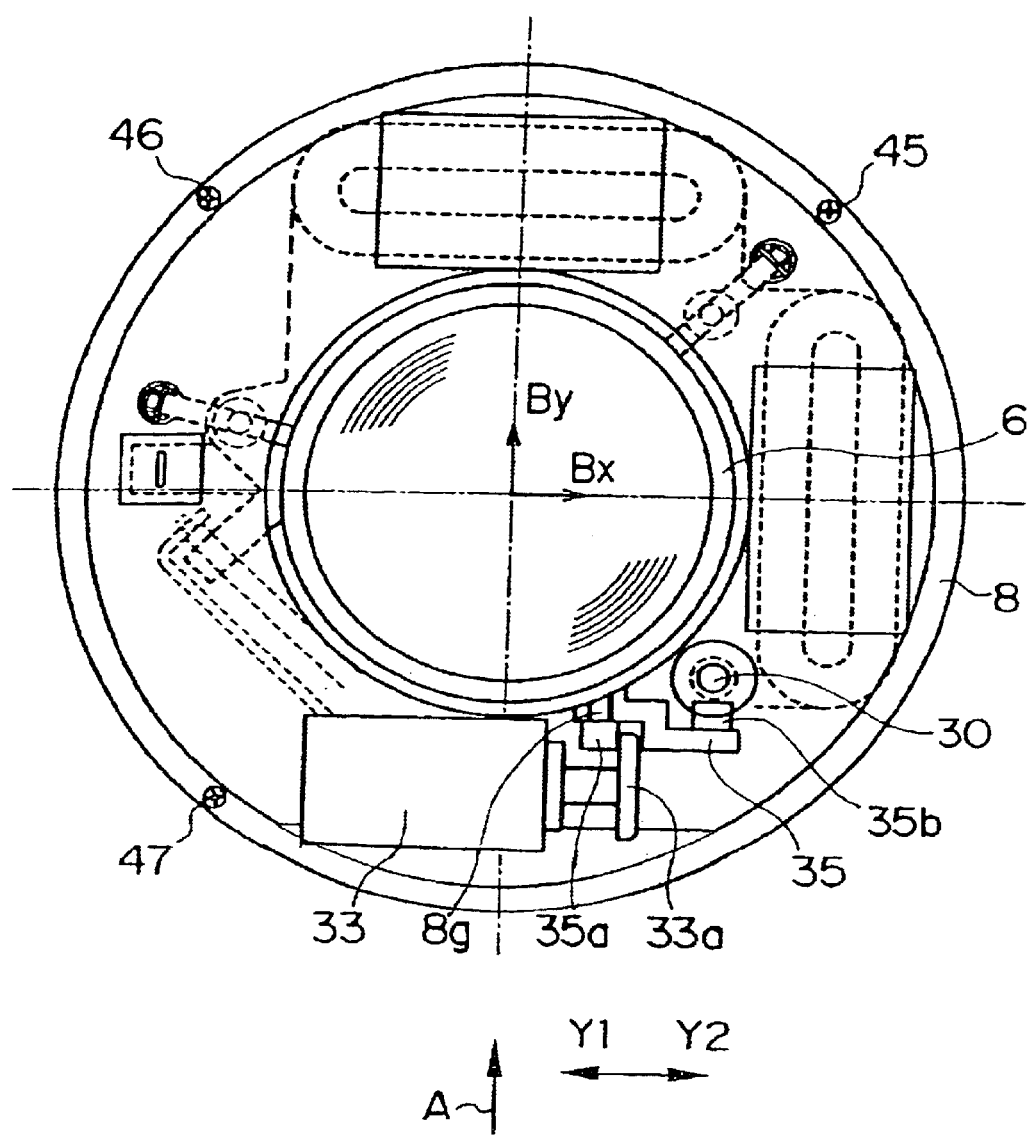
FIG. 2 is a front view of the blur correcting device at the lens barrel achieved in the embodiment.
Figure 4:
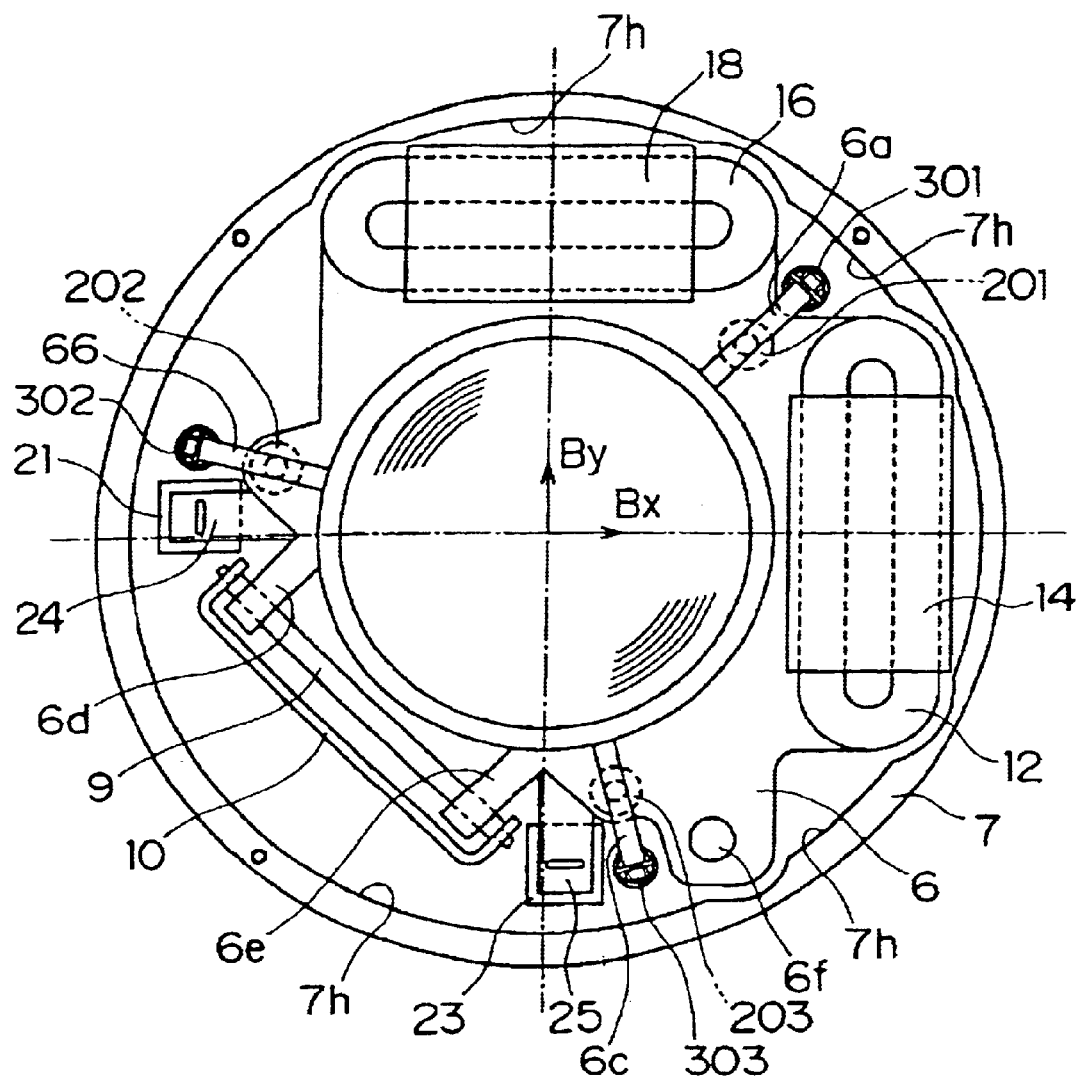
FIG. 4 is a front view of the blur correcting device at the lens barrel achieved in the embodiment.

Thus, as an electric current is supplied to the coil 12, the coil 12 receives a force along the direction Bx as indicated in FIGS. 2 and 4 and drives the blur correction lens 3.

Likewise, the voice coil motor 41 is an actuator constituted with a yoke 17, the coil 16, a permanent magnet 18 and a yoke 19. The yoke 17 is fixed to the casing member 8. The yoke 19 is fixed to the base member 7, whereas the permanent magnet 18 is fixed onto the yoke 19. The coil 16 is set between the yoke 17 and the permanent magnet 18.

Thus, as an electric current is supplied to the coil 16, the coil 16 receives a force along the direction By as indicated in FIGS. 2 and 4 and drives the blur correction lens 3.

A position sensor used to detect the position of the blur correction lens 3 is constituted of slit members 24 and 25 each having a slit formed therein, LEDs 20 and 22 and PSDs (position sensitive detectors) 21 and 23, as shown in FIGS. 3 and 4. The slit members 24 and 25 are fixed to the lens frame 6. The LEDs 20 and 22 are fixed to the casing 8. The PSDs 21 and 23 are fixed to the base member 7. Beams of light emitted by the LEDs 20 and 22 travel through the slits at the slit members 24 and 25 and reach the PSDs 21 and 23 respectively.

As a result, in conformance to the position to which the blur correction lens 3 has moved, the positions at which the light beams reach the PSDs 21 and 23 change, which, in turn, changes the output signals from the PSDs 21 and 23. Based upon these signals, the positions of the blur correction lens 3 along the two directions, i.e., the directions Bx and By, can be detected.

As shown in FIGS. 1 and 4, the lens frame 6, which is engaged with a guide shaft 9 at hook portions 6d and 6e, is allowed to move freely relative to the guide shaft 9 along the length of the guide shaft 9. The guide shaft 9 is rotatably fixed to a guide arm 10. As shown in FIG. 1, the guide arm 10 is mounted at a shaft 11 fixed to the base member 7 so as to be allowed to rotate freely around the axis of the shaft 11.

As a result, while the rotation of the lens frame 6 around the optical axis I is restricted by the guide shaft 9, the lens frame 6 is allowed to move along the length of the guide shaft 9. And also, since the guide shaft 9 can be displaced along a direction substantially perpendicular to its lengthwise direction, the lens frame 6 is allowed to move both along the direction By and along the direction Bx.

A movable unit is constituted with the blur correction lens 3, the lens frame 6, the coils 12 and 16, the LEDs 20 and 22 and the like, as described above.

The base member 7 includes an engaging portion 7h at which it is engaged with the casing member 8. Likewise, the casing member 8 includes an engaging portion 8h at which it is engaged with the base member 7. The engaging portion 8h of the casing member 8 is engaged with the engaging portion 7h of the base member 7, and the base member 7 and the casing member 8 are locked together in the thrust direction with locking screws 45, 46 and 47.

When the casing member 8 is engaged with the base member 7, the blur correction lens 3 and the above-described drive mechanism for driving the blur correction lens 3 are encased by the base member 7 and the casing member 8.

While two separate members, i.e., the base member 7 and the casing member 8, are used in the embodiment, these members may be collectively referred to as a base member.

A fixed unit is constituted with the base member 7, the casing member 8 and the like.

It is to be noted that although not shown, the base member 7 securely supports the non-blur correction lens 4. In addition, the non-blur correction lens 5 is fixed to the casing member 8.

A holding mechanism that holds the blur correction lens 3 is constituted with slide bearing members 101, 102 and 103, sliding tops 201, 202 and 203 and springs 301, 302 and 303 shown in FIGS. 1 and 4.

The slide bearing members 101~103 are fixed to the base member 7 around the blur correction lens 3.

The sliding tops 201~203 are fixed to the lens frame 6 at positions facing the slide bearing members 101~103 respectively. The slide bearing members 101~103 and the sliding tops 201~203 are respectively set in contact with each other and form slide portions.

In addition, the lens frame 6 is supported along the direction in which the sliding tops 201~203 come into contact with the slide bearing members 101~103 by the springs 301~303 held between spring retaining portions 6a, 6b and 6c at the lens frame 6 and spring retaining portions 7a, 7b and 7c at the base member 7 respectively.

Thus, the lens frame 6 is held at the base member 7 while being allowed to move smoothly at low load without becoming unstable along the optical axis I.

Figure 5:
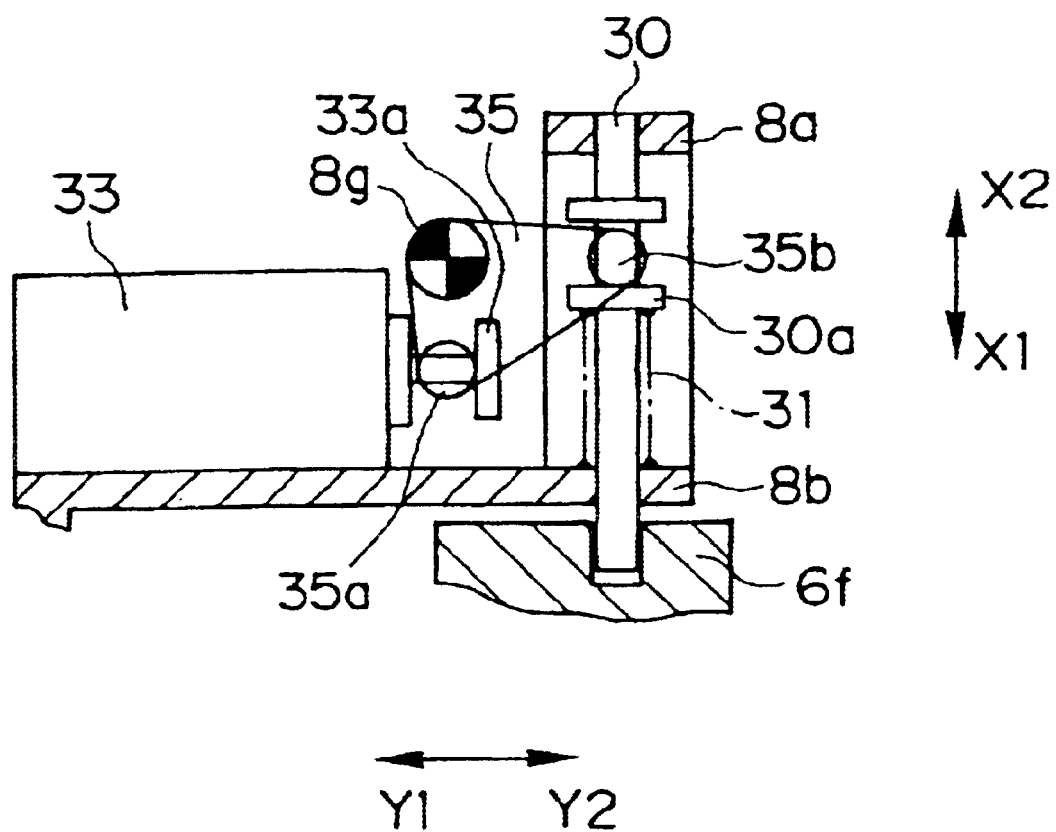
FIG. 5 shows the latch solenoid 33 in FIG. 2, viewed from the direction indicated by the arrow A.

The locking mechanism of the blur correcting device in the lens barrel achieved in the embodiment is now explained in reference to FIGS. 1, 2 and 5.

FIG. 5 shows a latch solenoid 33 in FIG. 2, viewed from the direction indicated by the arrow A.

The locking mechanism employed to lock the blur correction lens 3 at a specific position includes a locking pin 30, a locking spring 31, a triangular locking lever 35 and the latch solenoid 33.

The locking pin 30, which is engaged with the casing member 8 at engaging portions 8a and 8b, is allowed to move along directions X1 and X2 running substantially parallel to the optical axis I in FIG. 1. The locking pin 30 includes a locking pin collar portion 30a, and a force is applied to the locking pin 30 by the locking spring 31 provided between the casing member 8 and the locking pin collar portion 30a in the direction X2, i.e., in the lock-releasing direction.

The latch solenoid 33 is a locking actuator that achieves a bistable state, and it is capable of holding either the lock-released state or the locked state if power is supplied momentarily to activate the actuator even if the power supply is subsequently stopped. A plunger 33a is allowed to move along a direction Y1 or Y2 as an electric current flows to it.

The main body of the latch solenoid 33 is formed in an elongated cylindrical shape, and its dimension along the longitudinal direction including the plunger 33a is greater than the diameter of the cylinder. The longitudinal direction of the latch solenoid 33 may be also referred to as the lengthwise direction.

The latch solenoid 33 is fixed to the casing member 8 so as to set its length along the direction in which the tangential line of a circle having its center at the optical axis I extends on a plane perpendicular to the optical axis I. The inner side (the side of external surface toward the optical axis I) of the latch solenoid 33 is set at a position at which it does not eclipse the effective optical path of the blur correction lens 3, whereas its outer side is set as far as possible toward the outside within a range in which it does not project out from the external circumference of the casing member 8. By positioning the latch solenoid 33 as described above, the limited installation space can be effectively utilized. The length of the latch solenoid 33 extends along the direction in which the plunger 33a is driven and moves. In other words, the length of the latch solenoid 33 extends along the same direction as the drive shaft of the latch solenoid 33 extends.

The triangular locking lever 35 is a transmitting member mounted at the casing member 8 so as to be allowed to rotate freely around the rotational center 8g, and a triangular lever projection 35b is engaged with the locking pin collar portion 30a, whereas another triangular lever projection 35a is engaged with the plunger 33a. The triangular locking lever 35 alters the drive direction and the drive position of the drive force from the latch solenoid 33 and transmits the altered drive force to the locking pin 30. Namely, the triangular locking lever 35 communicates the force imparted by the latch solenoid 33 to the locking pin 30 by altering its direction by approximately 90 degrees. In addition, the rotational center 8g (the supporting point or fulcrum), the point at which the triangular lever projection 35b is engaged with the locking pin collar portion 30a (a point of application) and the point at which the other triangular lever projection 35a is engaged with the plunger 33a (a point of application) form a triangle.

During a locking operation, power is supplied to the solenoid 33 to pull the plunger 33a in the direction Y1, which, in turn, sets the locking pin 30 so as to project out along the direction X1 in FIG. 1 via the triangular locking lever 35. As a result, the locking pin 30 is driven into a locking hole 6f (engaging hole) formed at the lens frame 6, and the blur correction lens 3 becomes held at a specific position.

During a lock-releasing operation, the force with which the plunger 33a is pulled in the direction Y1 is weakened by supplying power to the solenoid 33 in a direction opposite from the direction along which power is supplied during the locking operation. Thus, the locking spring 31 causes the locking pin 30 to move in the direction X2, thereby releasing the lock on the blur correction lens 3.

In the embodiment, operations equivalent to those executed by installing the latch solenoid 33 along the optical axis as in the related art can be achieved without requiring much space along the optical axis. Namely, the latch solenoid 33 only requires enough space along the optical axis that substantially corresponds to the dimension of the latch solenoid 33 along the radial direction, and thus, as shown in FIG. 1, it does not require as much space as the locking pin 30 along the optical axis. As a result, the third lens group 53 and the aperture 57, which need to move closer to the blur correcting device during zooming drive or focusing drive are allowed to travel over larger distances.

Consequently, the overall lens barrel can be achieved as a more compact unit, the optical performance of the lens barrel can be improved, the minimum photographing distance can be reduced and higher magnification can be achieved through zooming.

(Modes of Variation)

The present invention is not limited to the embodiment explained above and allows for variations and modifications which are equally within the scope of the present invention.

For instance, while the outer side of the latch solenoid 33 is set as far as possible toward the outside within the range in which it does not project out from the external circumference of the casing member 8 in the embodiment, the present invention is not limited to this example. For instance, if the latch solenoid 33 is enclosed by the base member 7, the casing member 8 and the like, the latch solenoid 33 may be mounted by partially notching the external circumferences or the internal circumferences of the base member 7, the casing member 8 and the like.

While an explanation is given above in reference to the embodiment on an example in which the present invention is adopted in a camera lens barrel, the present invention is not limited to this example. The present invention may instead be adopted in a structure in which a photographic optical system and a correction optical system are not accommodated in the lens barrel, and the photographic optical system and the correction optical system may be provided at the camera body or the photographing apparatus main unit. In addition, the present invention may be adopted in a video camera that photographs dynamic images. Furthermore, the camera adopting the present invention may use film or it may be a digital camera that employs an image capturing element. In other words, the present invention may be adopted in all types of photographing apparatuses provided with a blur correcting device.

The advantages of the lens barrel having the blur correcting device achieved in the embodiment are summarized below. The lens barrel described above includes a locking actuator with its length set along the direction of the tangential line of a circle having its center at the optical axis on a plane substantially perpendicular to the optical axis, which generates a drive force for the locking mechanism. In this manner, the lens barrel can be realized as a compact lens barrel that does not take up significant space along the optical axis.

The locking actuator is constituted of a latch solenoid installed at a position at which the effective optical path of the blur correction optical system does not become eclipsed and, at the same time, the outer end of the latch solenoid does not project out from the external circumference of the base member. Therefore, the locking operation and the lock-releasing operation can be executed within a very short period of time with low power, the locking actuator can be installed by utilizing available space efficiently without taking up space in a wasteful manner, and the external diameter can be reduced.

Since the transmitting member transmits the drive force imparted by the locking actuator to the locking pin by altering the drive direction and/or the drive position, the degree of freedom in the arrangement of the locking pin and the locking actuator increases. Furthermore, the lens barrel can be realized as a more compact unit, and more reliable locking operation and lock-releasing operation are achieved.

The locking actuator installed by partially notching the external circumference and/or the internal circumference of the base member achieves miniaturization of the lens barrel regardless of the form of the base member.

The above described embodiment is an example and various modifications may be made without departing from the spirit and scope of the invention.

What is claimed is:

1. A blur correcting device comprising:
   a blur correction optical system that corrects an image blur by moving along a direction substantially perpendicular to an optical axis;
   a locking member that locks the blur correction optical system by moving along the optical axis when an image blur correction is not executed; and
   a lock drive device having an elongated external shape with a length thereof set along a direction in which a tangential line of a circle having a center thereof at the optical axis extends on a plane substantially perpendicular to the optical axis, which generates a drive force to drive the locking member.

2. A blur correcting device according to claim 1, wherein:
   the lock drive device generates the drive force along a direction in which the length thereof extends; and
   a transmitting member that transmits the drive force generated along the direction of the length of the lock drive device to the locking member by altering the direction to a direction in which the optical axis extends is also provided.

3. A blur correcting device according to claim 2, wherein:
   the transmitting member is capable of rotating around a supporting point, and a triangle is formed by the supporting point, a point of application for the locking member and a point of application for the lock drive device.

4. A blur correcting device according to claim 2, wherein:
   a dimension of the lock drive device along a direction perpendicular to its lengthwise direction is smaller than a dimension of the locking member taken along the optical axis.

5. A lens barrel comprising a blur correcting device according to claim 1.

6. A photographing apparatus comprising a blur correcting device according to claim 1.

7. A lens barrel comprising:
   a photographic optical system;
   a blur correction optical system constituting at least part of the photographic optical system, which corrects a blur by moving along a direction substantially perpendicular to an optical axis;

a locking mechanism that locks the blur correction optical system when a blur correction operation is not executed; and a locking actuator having an elongated external shape with a length thereof set along a direction in which a tangential line of a circle having a center thereof at the optical axis extends on a plane substantially perpendicular to the optical axis, which generates a drive force to drive the locking mechanism, wherein:

the locking mechanism includes a locking member that locks the blur correction optical system by moving along the optical axis.

8. A lens barrel according to claim 7, further comprising:

a blur correction actuator that drives the blur correction optical system; and a base member having an external circumference thereof formed as a substantially cylindrical surface, in which the blur correction actuator, the blur correction optical system, the locking mechanism and the locking actuator are provided, wherein:

the locking actuator is a latch solenoid installed at a position at which the latch solenoid does not eclipse an effective optical path of the blur correction optical system and also the latch solenoid does not project out from the external circumference of the base member.

9. A lens barrel according to claim 8, wherein:

the locking mechanism includes the locking member that is a locking pin that moves along a direction substantially parallel to the optical axis to become engaged with an engaging hole provided at the blur correction optical system; and a transmitting member that transmits the drive force imparted by the locking actuator to the locking pin; and the transmitting member transmits the drive force from the locking actuator to the locking pin by altering a direction of the drive force.

10. A lens barrel comprising:

a photographic optical system;

a blur correction optical system constituting at least part of the photographic optical system, which corrects a blur by moving along a direction substantially perpendicular to an optical axis;

a locking mechanism that locks the blur correction optical system when a blur correction operation is not executed; and a locking actuator having an elongated external shape with a length thereof set along a direction in which a tangential line of a circle having a center thereof at the optical axis extends on a plane substantially perpendicular to the optical axis, which generates a drive force to drive the locking mechanism, wherein:

the locking actuator is a latch solenoid installed at a position at which the latch solenoid does not eclipse an effective optical path of the blur correction optical system.

* * * * *